United States Patent
Wafer et al.

[11] 3,743,884
[45] July 3, 1973

[54] OVERVOLTAGE PROTECTOR

[75] Inventors: John A. Wafer, Monroeville; John D. Borst, Sharon, both of Pa.

[73] Assignee: Westinghouse Electric Corporation, Pittsburgh, Pa.

[22] Filed: Feb. 2, 1972

[21] Appl. No.: 222,941

[52] U.S. Cl. .............. 315/36, 313/156, 317/12 A, 317/12 B, 317/69, 317/74
[51] Int. Cl. .............................. H02h 7/16
[58] Field of Search ............. 317/14, 15, 16, 12, 317/74, 69, 70; 315/36; 313/DIG. 5, 156

[56] References Cited
UNITED STATES PATENTS

| | | |
|---|---|---|
| 2,743,395 | 4/1956 | Marbury et al. ............... 317/12 A |
| 3,252,051 | 5/1966 | Walker ............................ 317/12 R |
| 3,254,268 | 5/1966 | Radus et al. ..................... 315/340 |

*Primary Examiner*—John Kominski
*Attorney*—A. T. Stratton et al.

[57] ABSTRACT

Protection apparatus for a capacitive means which is effectively connected in series with a power transformer. A first spark gap and a resistance are serially interconnected and the combination is connected in parallel with the capacitive means. A second spark gap is connected in parallel with the resistance. The first spark gap is constructed to arc at a lower voltage than the second spark gap. With this apparatus, ferroresonance is dampened without an overvoltage surge on the capacitive means.

9 Claims, 7 Drawing Figures

Patented July 3, 1973      3,743,884

OVERVOLTAGE PROTECTOR

BACKGROUND OF THE INVENTION

1. Field of the Invention

This invention relates, in general, to voltage limiting means for capacitors and, more specifically, to overvoltage protectors for capacitors which are effectively connected in series with power transformers.

2. Description of the Prior Art

Ferroresonance is a condition which may develop in the primary circuit of a power transformer when it is electrically connected in series with a capacitor. Ferroresonance is also possible with a "Capaciformer" which has an equivalent circuit similar to a capacitor and a transformer connected in series.

Ferroresonance is basically a condition which produces a sub-harmonic current in the circuit of the capacitor and the transformer, however arbitrary frequency currents have also been observed. The subharmonic current is usually equal to many times the steady state or nominal current rating of the transformer, thus abnormally high voltages may develop across the capacitor. Ferroresonance is a particularly troublesome problem when energizing a serially connected capacitor and transformer when the secondary of the transformer is connected to a large load having a low power factor. The capacitor overvoltage produced by the ferroresonant condition can be destructive if proper protection is not employed. The capacitor voltage may be represented by the relationship:

$$V_C = (1/C) \int i\, dt$$

where $V_C$ is the capacitor voltage, $C$ is the capacitance, and $i$ is the instantaneous current flowing through the capacitor.

To eliminate the hazards of capacitor overvoltages when ferroresonant conditions exist in the circuit, capacitor overvoltage protectors must be used to limit the voltage which can develop across the capacitor. The spark gap apparatus disclosed in U.S. Pat. No. 3,254,268, which is assigned to the same assignee as this invention, provides a capacitor overvoltage protector which may be used to prevent breakdown of the dielectric of the capacitor.

Unfortunately, a ferroresonant condition can persist for a long period of time without proper dampening impedances. This places a limit on the practicability of constructing overvoltage protectors having spark gaps since the contacts will only withstand arcing for a limited period of time. If the ferroresonant condition is severe enough, the spark gap electrodes may be damaged before the ferroresonant condition subsides. In the referenced patent, a magnetic field is provided across the arc path of the spark gap to move the arc and reduce electrode erosion.

It has been found that a resistive impedance connected in series with the spark gap provides a capacitor discharging action which satisfactorily dampens the ferroresonant condition. The value of resistance most effective is generally on the order of the impedance of the capacitor. However, under certain conditions, the addition of a resistance in series with the spark gap can prevent the spark gap from properly limiting the voltage on the capacitor.

It is desirable, and it is an object of this invention, to provide capacitor overvoltage protection apparatus which permits the dampening effect of a resistive element serially connected with the spark gap while effectively limiting the voltage on the capacitor.

SUMMARY OF THE INVENTION

There is disclosed herein new and useful apparatus for limiting the voltage on a capacitive means serially connected with a transformer. A first spark gap with a resistance in series therewith is connected in parallel circuit relationship with the capacitive means. A second spark gap is connected across the resistance. When the ferroresonant current is large enough to produce a voltage across the capacitive means equal to the breakdown voltage of the first spark gap, the spark gap arcs, thereby discharging and partially by-passing the capacitive means. If the ferroresonant current is greater than the discharge or spark gap current, the voltage across the capacitive means continues to increase due to the voltage drop across the resistance.

A second spark gap is connected across the resistance and is adjusted to arc when the voltage across the resistance is at a predetermined value. Since the full voltage across the capacitive means is placed across the resistance and the second spark gap when the first spark gap is arcing, the predetermined arcing value of the second spark gap determines the upper limit of the voltage on the capacitance means.

Therefore, the second spark gap limits the voltage on the capacitive means when the ferroresonant condition is severe. When the ferroresonant current is not large enough to initiate an arc in the second spark gap, or when the arcing in the second spark gap reduces the current to a value which does not cause the second spark gap to arc, the resistance is part of the circuit and the ferroresonant condition is dampened.

BRIEF DESCRIPTION OF THE DRAWINGS

Further advantages and uses of this invention will become more apparent when considered in view of the following detailed description and drawings, in which.

DESCRIPTION OF THE PREFERRED EMBODIMENTS

Figure 1:
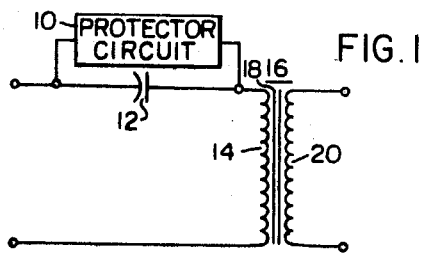
FIG. 1 is an electrical schematic diagram illustrating an overvoltage protector connection arrangement for a transformer connected in series with a capacitor.

Throughout the following description, similar reference characters refer to similar members in all figures of the drawings.

Referring now to the drawings, and FIG. 1 in particular, there is shown a protector circuit 10 connected in parallel with a capacitor 12. The capacitor 12 is connected in series with the primary winding 14 of the transformer 16. The transformer 16 also includes a laminated magnetic core 18 and a secondary winding 20.

When large transient or ferroresonant currents flow in the primary winding 14 of the transformer 16, the voltage developed across the capacitor 12 may be dangerously high. To limit the voltage on the capacitor 12 to prevent the breakdown of its insulation structure, the protector circuit 10 is used to provide a path for part of the current of the primary winding 14. In addition to the by-passing function of the protector circuit 10, it also discharges the capacitor 12. From the by-passing and discharging functions of the circuit 10, the ferroresonant condition is suppressed to the point where it no longer is a danger to the insulation structure of the capacitor.

FIG. 1 represents the capacitor 12 and the transformer 16 being separate elements. Actually, they may be combined in one transformer unit, such as in the "capaciformer" shown in FIG. 2. The equivalent circuit of the "Capaciformer" circuit shown in FIG. 2 may be represented by the circuit shown in FIG. 1.

Figure 2:
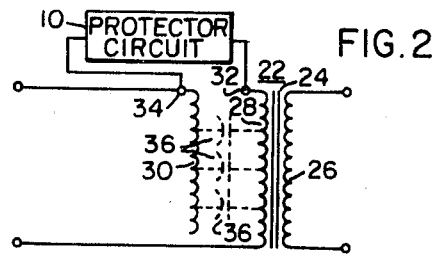
FIG. 2 is an electrical schematic diagram illustrating an overvoltage protector connection arrangement for a capaciformer.

In FIG. 2, the transformer 22 includes a laminated magnetic core 24, a secondary winding 26, and primary windings 28 and 30. The primary windings are connected, at the terminals 32 and 34, to the protector circuit 10. The primary windings 28 and 30 of this type of transformer have a relatively high capacitive coupling between them, as illustrated by the capacitive elements 36. The capacitive elements 36 are effectively in series with the primary windings 30 and 32 of the transformer 22, just as the capacitor 12 is in series with the winding 14 of the transformer 16 shown in FIG. 1. The general purpose of the series capacitance in both transformer arrangements is to improve the regulation of the transformer.

Figure 3:
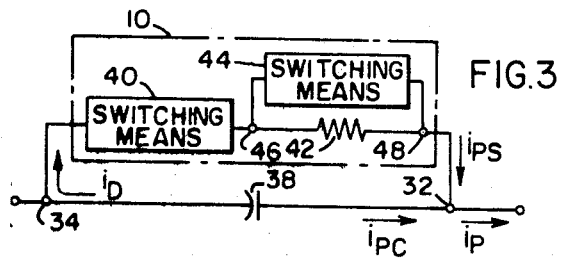
FIG. 3 is an electrical schematic diagram illustrating details of an overvoltage protector constructed according to the teachings of this invention.

The protector circuit 10 shown in FIGS. 1 and 2 is illustrated in more detail in FIG. 3. The capacitor 38 represents a capacitive circuit element, such as the capacitor 12 in FIG. 1, or the equivalent capacitance of a winding structure, such as that represented by the capacitors 36 in FIG. 2. The protector circuit 10 includes a switching means 40 which is connected in series with an impedance, such as the resistor 42. The serial combination of the switching means 40 and the resistor 42 is connected to the terminals 32 and 34, thus forming a by-passing circuit around the capacitor 38. A switching means 44 is connected between the terminals 46 and 48 of the resistor 42.

Each switching means 40 and 44 functions similarly, except for the value of the voltage across the switching means which causes it to function. The switching means, in general, has a characteristic such that it does not conduct a substantial amount of current until the voltage across it reaches its predetermined voltage rating. Once the applied voltage reaches the voltage rating of the switching means, it becomes substantially conductive. The switching means remains substantially conductive until the current flowing through the switching means is essentially zero. At this instant of time, the conductive state of the switching means reverts to a non-conductive state until such time as the voltage applied to the switching means again reaches the predetermined voltage rating. The switching means exhibits this characteristic regardless of the polarity of the applied voltage.

The predetermined voltage rating of the switching means 40 is sufficiently high enough above the safe operating voltage of the capacitor to allow small capacitor overvoltages to be tolerated without activating the switching means 40. Its exact value is governed by many factors, including the nominal voltage rating of the capacitor, the maximum safe voltage rating of the capacitor, the delay time of circuit breakers, fuses, or other overload devices, and the expected overload conditions.

The predetermined voltage rating of the switching means 44 is greater than the predetermined voltage rating of the switching means 40. The maximum voltage which can appear across the capacitor 38 is equal to the predetermined voltage rating of the switching means 44, thus many of the factors governing the selection of the upper limit of the voltage rating of the switching means 40 apply to the selection of the voltage rating of the switching means 44. The voltage rating of the switching means 44 is typically only a small percentage above the voltage rating of the switching means 40, such as 10 percent, although other values may be used.

The resistance of the resistor 42 may vary depending upon the other variable factors of the circuit. A value within the range of the impedance of the capacitor 38 has proven satisfactory. A range of from 70 to 275 percent of the impedance of the capacitor 38 has been found to provide sufficient ferroresonant dampening action.

The switching means 40 and 44 may comprise an arrangement of solid state elements such as silicon controlled rectifiers, and arrangement of electrodes to provide a spark gap, or any other suitable elements to provide the desired characteristics. An arrangement using spark gaps is illustrated in FIG. 4.

Figure 4:
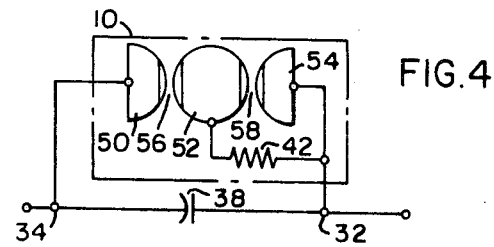
FIG. 4 is a diagram illustrating an overvoltage protector constructed according to the teachings of this invention and having spark gaps.

In FIG. 4, the spark gap electrodes 50, 52 and 54 form the equivalent of both the switching means 40 and the switching means 44 of FIG. 3. The spark gap 56 corresponds to the switching means 40 and the spark gap 58 corresponds to the switching means 44. The electrodes 50, 52 and 54 have shapes which tend to move the arc away from the center of the spark gaps 56 and 58 to "blow out" the arc and prolong the life of the electrode surfaces. The electrodes may be constructed of a conducting material, such as copper, and may have an arc resistant material, such as silver-tungsten, adjacent to the area where the arc strikes.

The gap distance of the spark gap 56 is less than the gap distance of the spark gap 58. Thus, the spark gap 56 arcs first on a capacitor overvoltage and spark gap 58 arcs if the capacitor overvoltage does not decrease sufficiently, as will be described hereinafter in more detail. Members which produce a magnetic field across the gap may be used to move the arc for prolonging the life of the electrodes. Care must be exercised in determining the intensity of the magnetic field. If it is too great, the arc may be extinguished before the capacitor is discharged.

Figure 5:
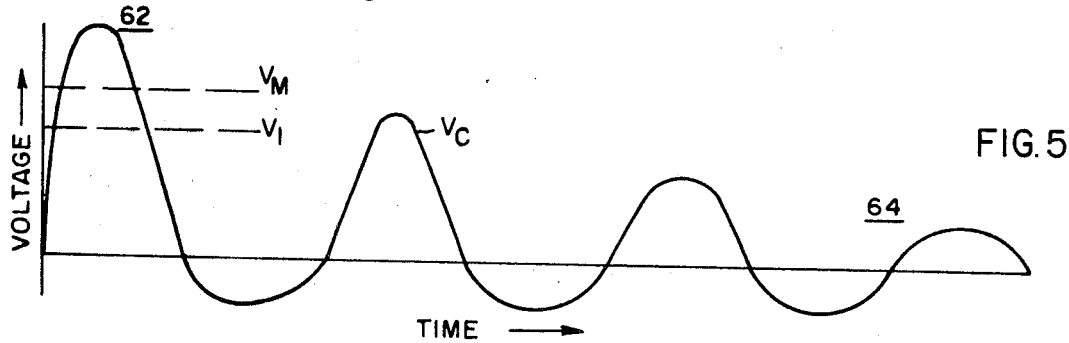
FIG. 5 is a waveform of the capacitor voltage for one form of overvoltage protector.
Figure 6:
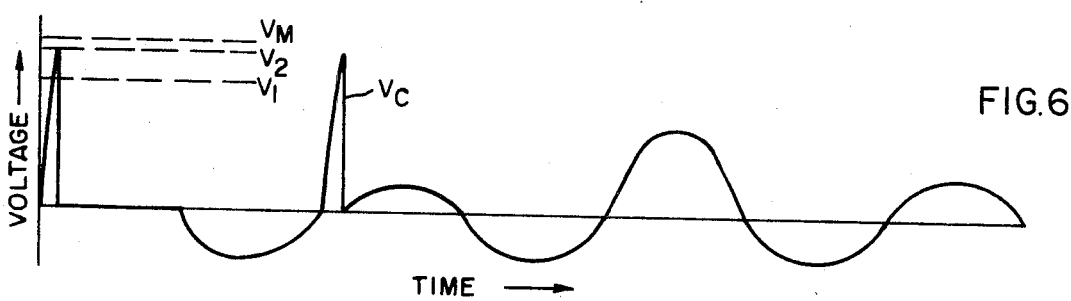
FIG. 6 is a waveform of the capacitor voltage when protected by the apparatus disclosed by this invention.

To describe the operation of the protector circuit 10, the waveforms of FIGS. 5 and 6 will be used together with the current vectors illustrated in FIG. 3. When a ferroresonant condition occurs, such as when energizing a transformer having a capacitor in series therewith, a large and unstable primary current tends to flow through the capacitor. Without the protector circuit 10, the current $i_P$ would flow through the capacitor 38 and could increase the voltage across the capacitor 38 beyond its safe operating range.

Since switching means 40 and 44 are substantially non-conductive and since the initial current flowing in the resistance 42 is negligible, the capacitor voltage initially develops across the switching means 40. When the capacitor voltage reaches the voltage rating of the switching means 40, the switching means 40 becomes conductive, thereby providing an additional path for the primary current $i_P$. The path through the capacitor has been noted as $i_{PC}$ and the path through the other branch is denoted as $i_{PS}$. The ratio of the current $i_{PS}$ and $i_{PC}$ are dependent largely upon the capacitance of the capacitor 38 and the ohmic value of the resistor 42. Nevertheless, $i_P$ is equal to the sum of $i_{PC}$ and $i_{PS}$. Since the switching means 40 is now substantially conductive, the full voltage across the capacitor 38 is applied to the resistance 42.

In addition to the currents produced by the primary current $i_P$, a discharge current $i_D$ flows with the polarity indicated around the loop containing the switching means 40, the resistance 42, and the capacitor 38. Usually, the current $i_{PC}$ is larger than the current $i_D$ due to the discharge time constant of the loop circuit. This produces a further increase in capacitor voltage so long as $i_{PC}$ is greater than $i_D$. The full capacitor voltage is placed across the resistance 42 and, if not for the switching means 44, the maximum capacitor voltage would be exceeded. However, when the voltage across the resistor 42 increases to the voltage rating of the switching means 44, the switching means becomes conductive and shunts the resistor 42. When this occurs, the discharge rate is rapidly increased since the resistance is removed from the discharge path. Thus, the capacitor voltage is effectively limited to a value equal to the voltage rating of the switching means 44. When the capacitor voltage due to the ferroresonant condition does not develop above the voltage rating of the switching means 44, the resistor 42 across the capacitor 38 dampens the ferroresonant condition until the steady state condition is achieved.

FIG. 5 illustrates a waveform of capacitor voltage $V_C$ which may exist under ferroresonant conditions without the switching means 44 connected across the resistor 42. The lower half-cycles of the waveform are equal to each other since ferroresonant conditions have been found to generally exhibit a sub-harmonic nature, although other frequencies have been observed. The ferroresonant frequency illustrated is one-half the normal capacitor voltage frequency. During the first ferroresonant peak 62, the voltage $V_C$ reaches a value above the voltage rating $V_1$ of the switching means 40 and the maximum voltage $V_M$ tolerable by the capacitor. Even though the ferroresonant condition is effectively dampened to the steady state wave-form portion 64, the peak or half-cycle spike of capacitor voltage exceeds the maximum safe value and capacitor destruction is likely.

In FIG. 6, the capacitor voltage $V_C$ is plotted for the circuit of FIG. 3 with the switching means 44 connected in parallel with the resistor 42. When the voltage rating $V_1$ of the switching means 40 is reached, the switching means 40 conducts but the capacitor voltage $V_C$ still increases. When $V_C$ reaches the voltage rating $V_2$ of the switching means 44, it conducts and abruptly discharges the capacitor. $V_2$ is selected at a level which prevents $V_C$ from exceeding the maximum permissible capacitor voltage $V_M$. Recovery may take more than the two cycles illustrated in FIG. 6, however, tests have indicated that the protector disclosed herein will dampen the ferroresonant condition within a reasonable time for most practical situations.

Experimental tests with a 25 KVA, 60 Hertz, 7,200 volt transformer, having a series capacitance of 20 microfarads and spark gaps with breakdown voltages of 1,800 and 2,200 volts were conducted. The capacitor-transformer combination was energized under different conditions to develop ferroresonant inrush currents. Recovery time is the number of cycles required for the spark gap to discontinue arcing. Under no load conditions, with a gap series resistance ranging from 100 to 300 ohms, a recovery time of 4 to 14 cycles was observed. Under full load conditions with a 0.7 power factor and a gap series resistance ranging from 150 to 300 ohms, a recovery time of 16 to 25 cycles was observed. Similarly, fully loaded tests with a 0.9 power factor load showed a recovery time from 27 to 59 cycles.

Figure 7:
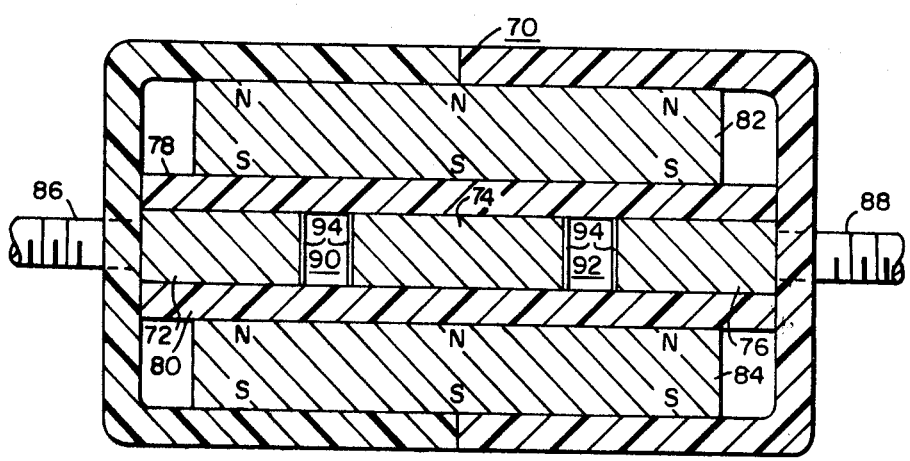
FIG. 7 is a sectional view illustrating a physical configuration for the spark gap electrodes.

A physical arrangement for the switching means 40 and 44 as schematically illustrated in FIG. 4 is illustrated in FIG. 7. In FIG. 7, the housing assembly 70, constructed of a non-magnetic insulating material, contains the electrodes 72, 74 and 76. Insulating members 78 and 80 separate the electrodes from the permanent magnets 82 and 84. The terminals 86 and 88 provide means for connecting the electrodes 72 and 76, respectively, to the capacitor being protected. The terminal for connecting to the electrode 74 is not shown and may be brought out perpendicularly to the plane of the figure.

The permanent magnets 82 and 84 have magnetic poles across their faces as indicated. This places magnetic fields in the gaps 90 and 92 which tend to move the arc along the electrodes to increase the life of the electrodes. The arc resistant material 94 also increases the life of the electrodes. The insulating members 78 and 80 prevent contamination of the gap areas by particles from the permanent magnets 82 and 84.

There has been disclosed new and useful apparatus for limiting the voltage on a capacitive means which may be associated with a power transformer. The invention permits ferroresonant dampening without a harmful overvoltage transient. Since numerous changes may be made in the above-described apparatus and different embodiments of the invention may be made without departing from the spirit thereof, it is intended that all of the matter contained in the foregoing description, or shown in the accompanying drawings, shall be interpreted as illustrative rather than limiting.

What is claimed is:

1. Protective means for limiting the voltage across a capacitive means, said protective means comprising a first switching means, an impedance means connected in series circuit relationship with said first switching means, the series combination of said impedance means and said first switching means being connected in parallel circuit relationship with the capacitive means, a second switching means connected in parallel circuit relationship with said impedance means, said first switching means having a first predetermined voltage rating, said second switching means having a second predetermined voltage rating, said first and second switching means each having switching characteristics dependent upon the voltage across said switching means, each of said switching means becoming substantially conductive when the voltage across the particular switching means is equal to its predetermined voltage rating and remaining substantially conductive until the magnitude of the current flowing through the switching means is substantially zero.

2. The protective means of claim 1 wherein the first predetermined voltage rating is lower than the second predetermined voltage rating.

3. The protective means of claim 1 wherein the impedance means comprises a resistance means having a value of resistance which is substantially within the range of the value of the impedance of the capacitive means.

4. The protective means of claim 1 wherein each switching means comprises spark gap means.

5. The protective means of claim 4 wherein the spark gap means comprises first, second and third electrodes, said second electrode being positioned between said first and third electrodes, the gap distance between said first and second electrodes being smaller than the gap distance between said second and third electrodes.

6. The protective means of claim 5 wherein the electrodes are shaped to permit the movement of arcs which strike across the gaps between the electrodes for the purpose of extending the life of the electrodes.

7. The protective means of claim 5 wherein the electrodes have arc resistant material disposed adjacent to the gap surfaces of the spark gaps.

8. The protective means of claim 5 including means which produce a magnetic field across the gaps.

9. Protective means for limiting the voltage between primary windings of a transformer wound with a plurality of capacitively coupled primary windings, said protective means comprising first spark gap means, resistance means connected in series circuit relationship with said first spark gap means, the series combination of said first spark gap means and said resistance means being connected between the primary windings of the transformer, second spark gap means connected in parallel circuit relationship with said resistance means, said first spark gap means having a breakdown voltage which is lower than the breakdown voltage of said second spark gap means.

* * * * *